Feb. 25, 1947.   G. V. RYLSKY   2,416,646
MEANS FOR RESTORING DIRECTIONAL GYROS
Filed April 20, 1944   2 Sheets-Sheet 1

INVENTOR.
Gregory V. Rylsky.
BY
Herbert M. Birch
ATTORNEY

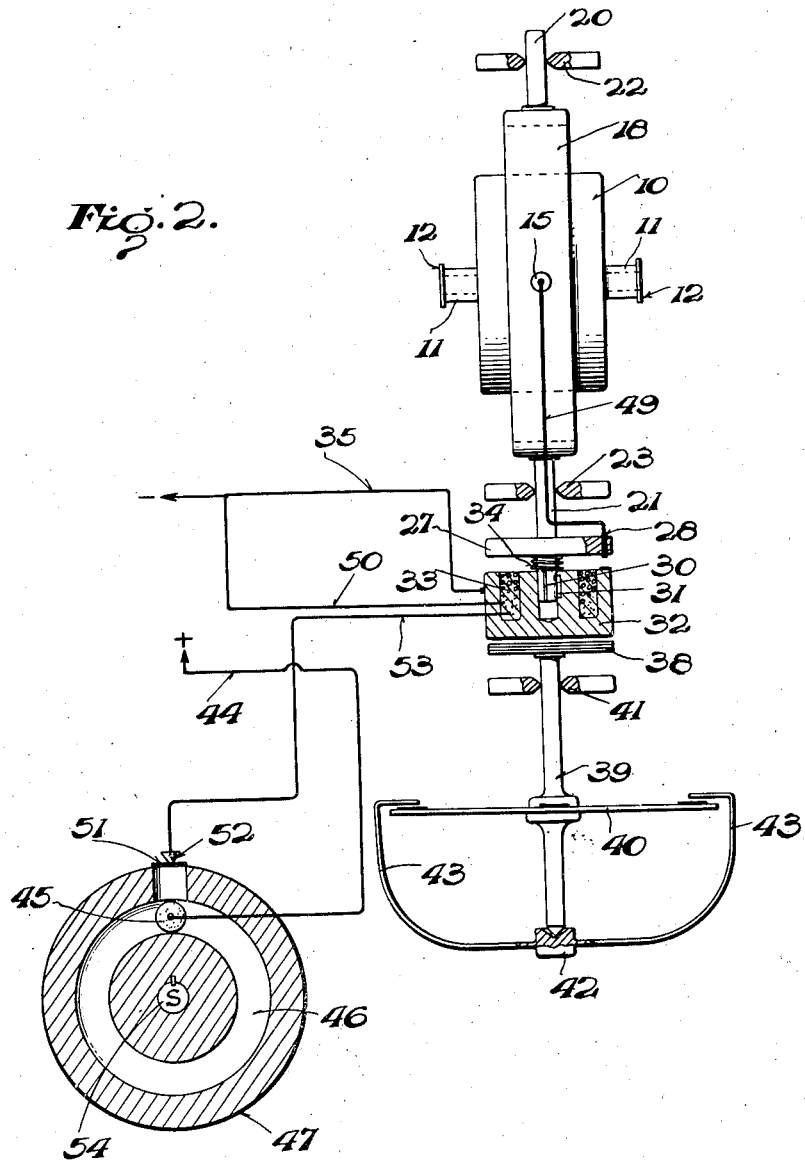

Patented Feb. 25, 1947

2,416,646

UNITED STATES PATENT OFFICE 2,416,646

MEANS FOR RESTORING DIRECTIONAL GYROS

Gregory V. Rylsky, Ridgefield Park, N. J., assignor to Bendix Aviation Corporation, Teterboro, N. J., a corporation of Delaware Application April 20, 1944, Serial No. 531,933

12 Claims. (Cl. 33—204)

This invention relates to gyroscopes and particularly to novel means for resetting directional gyroscopes.

Gyroscopes having three degrees of freedom, such as directional gyroscopes, have a tendency to become inclined to the horizontal, so that unless they are restored or reset at frequent intervals their directive value becomes defective. Heretofore resetting was accomplished by mechanical and/or fluid arrangements requiring considerable mechanism, and during restoration of the gyroscope to a horizontal plane from an inclined plane, by some such restoring force the compass or indicator reading is subjected to error due to such angular departure, unless means are provided to first disconnect the gyroscope from the indicator, so that the restoring force required to return the gyroscope to its neutral horizontal axis will not distort the indicator mechanism.

Accordingly, an object of the present invention is to provide novel means for disconnecting the gyroscopic device from the indicator mechanism before a restoring force is applied.

Another object of the present invention is to provide novel means whereby the gyroscope may be quickly restored electrically to the magnetic meridian thereby eliminating the usual mechanical or fluid means required heretofore for this purpose.

Another object of the present invention is to provide a novel resetting arrangement including means for periodically and automatically disconnecting the indicator shaft prior to the resetting operation to thereby prevent distortion of the indicator reading during resetting of the gyroscope from an inclined plane to its neutral horizontal axis.

Another object is to provide novel means for resetting a gyroscopic element from an inclined plane to its neutral horizontal axis, whereby the gyroscopic element is reset periodically and automatically by electrically timed restoring impulses.

Still another object is to provide a novel arrangement of an automatic gyroscopic element restoring means, which is simple and easy to manufacture and install.

The above and other objects and advantages of the invention will appear more fully hereinafter from a consideration of the detailed description which follows, taken together with the accompanying drawings wherein one embodiment of the invention is illustrated. It is to be expressly understood, however, that the drawings are for the purpose of illustration only and are not intended to define the limits of the invention, reference being had for this purpose to the appended claims.

In the drawings wherein like reference characters refer to like parts throughout the several views, Figure 1 is a front view partly in cross section and partly diagrammatic of the present invention.

Figure 2 is a side view of the present invention of the same nature as that shown in Figure 1.

Figure 3:
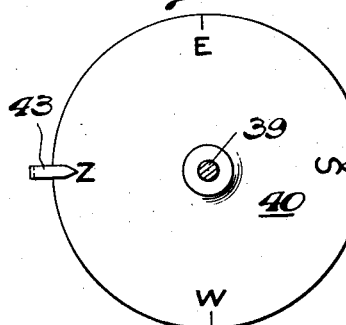
Figure 3 is a top plan view of the compass card shown in Figures 1 and 2.
Figure 1:
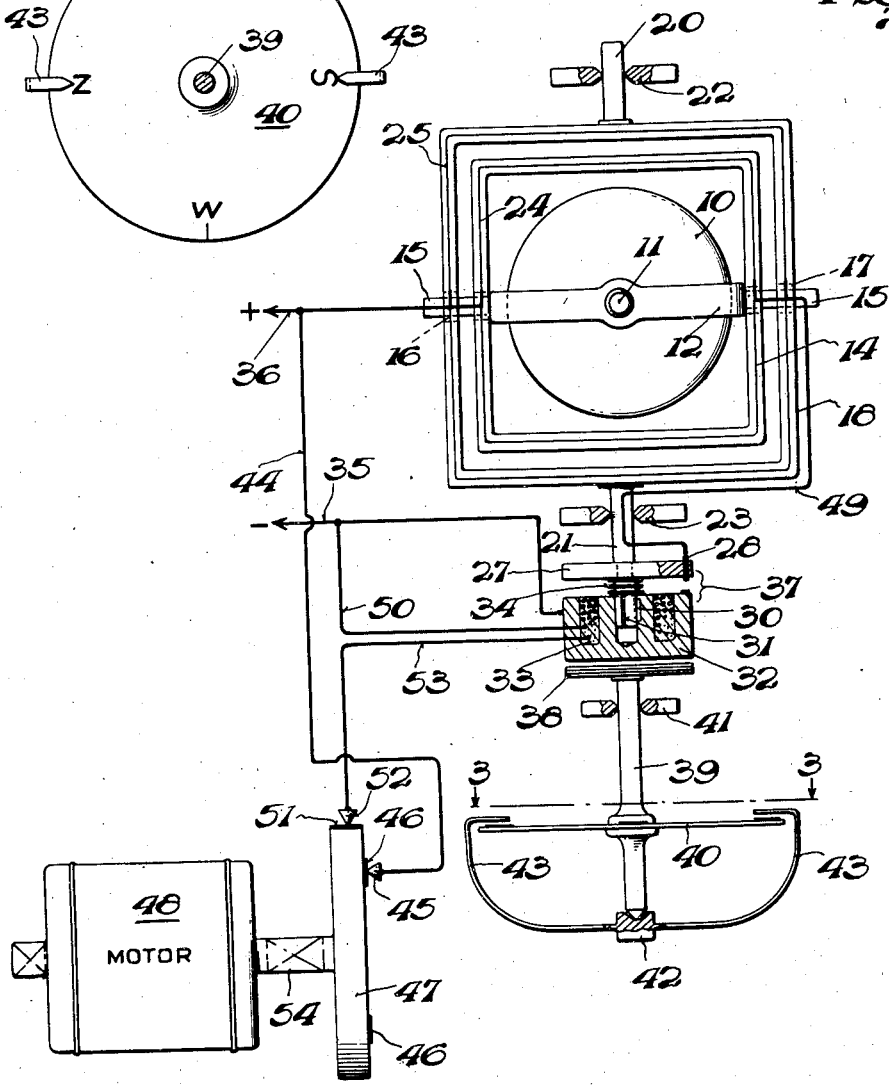

Referring to the drawings, there is shown in Figure 1 a gyroscope rotor 10, which is arranged to be rotated in trunnions 11 mounted in gimbal frame 12 by any suitable means, not shown, such as is well known to the art. On the gimbal frame 12 is mounted a frame 14 perpendicular thereto, which frame 14 is journalled for oscillation about a horizontal axis with the gyroscope 10 and gimbal frame 12 on trunnion shafts 15, which are supported in suitable bearings 16 and 17 in gimbal frame 18. This frame 12 is concentrically located within the relatively larger gimbal frame 18.

The frame 18 is rotatable in azimuth and is mounted on vertically aligned shafts 20 and 21 attached to and extending from the top and bottom of frame 18, which shafts are supported by jewel bearings 22 and 23, respectively, and are turned by the precessional forces of the gyroscope 10.

On the concentrically arranged frame 14 and gimbal frame 18, respectively, are wound coils 24 and 25. These coils 24 and 25 are so connected, that when current flows through them the resulting magnetic fields so produced around the coils provides a mutual magnetic attraction to align the respective frames 14 and 18, so that the plane of coil 24 is in coincidence with that of coil 25. The resulting effect is to restore or reset the gyroscope rotor 10 from any inclined plane to its neutral horizontal plane, which rotor and gimbal frame 12 both move with the coil 24 and frame 14 to thereby restore the axis defined by trunnions 11 to a neutral horizontal plane.

Below the above-described gyro assembly is an electro-magnetic throw-out assembly for a friction clutch adapted to disconnect the indicator mechanism hereinafter described, prior to energization of restoring coils 24 and 25. The throw-out assembly includes a disc 27 of magnetic material mounted on shaft 21, which may or may not be allowed to rotate in one plane, having an insulated spring contact button 28. Also, mounted over the end of shaft 21 on splines 30 and 31 is the magnetic clutch plate 32 of the clutch unit. Contact 28 is adapted to be engaged by a contact immediately therebelow on clutch plate 32 for closing a circuit through the clutch plate and coils 24 and 25 when the clutch plate is displaced upwardly. The clutch unit comprises an electro-magnetic winding 33 in the plate 32 and a clutch plate 38 of non-magnetic material, such as Bakelite adapted to provide a frictional drive coupling between shafts 21 and 39.

Mounted around the splined end of shaft 21 between the disc 27 and the top of magnetic clutch plate 32 is a yieldable separating means, such as spring 34. This spring normally holds clutch plate 32 downwardly and in driving relationship with clutch plate 38. Thus when current is applied by leads 35 and 36, see Figure 1, as hereinafter explained, to winding 33 the magnetic clutch plate 32 slides on the splined end of shaft 21 toward the magnetic disc 27 to uncouple the clutch plate 32 from plate 38 on shaft 39, thereby effecting a through circuit for coils 24 and 25 from lead 35 and 36 and through the switch assembly 37 at the spring contact button 28. The friction clutch disc 38 when coupled with the clutch plate 32 drives shaft 39 and a compass card 40 with respect to the lubber's line or index 43 to give indications in azimuth. If desired, the shaft 39 may be arranged to actuate an electrical self-synchronous transmitting device or a rotary transformer, not shown, suitable for conveying an electric signal or impulse for remote compass readings. The shaft 39 is supported by suitable means, such as bearings 41 and 42.

The present system includes an electrical timing circuit for energizing the coils 24 and 25 periodically and is adapted to receive current from leads 35 and 36. The positive lead 36, for example, connects coils 24 and 25 in parallel, as shown, to push button contact 28, or in series, if desired, and lead 44, tapped off from lead 36, connects to a brush 45 contacting a slip ring 46 of a commutator device 47, which controls the timing circuit and the periodic energization of the coils 24 and 25.

The commutator 47 is driven by a slow speed motor 48, and is arranged to energize the electro-magnetic clutch winding 33 at predetermined time intervals.

The motor 48 turns commutator 47 by shaft 54, and the commutator 47 is comprised of an insulating material except for a conducting segment 51, which a brush 52 is arranged to contact at predetermined time intervals. From the winding 33, the circuit is completed through lead 50 tapped to negative lead 35, and the circuits of coils 24 and 25 are completed through negative lead 35 tapped to the outer negative pole of magnetic clutch plate 32 when clutch plate 32 has been displaced upwardly upon energization of winding 33.

It is, of course, obvious that brush 45 is constantly in contact with slip ring 46 to provide the positive side of the circuit through brush 52 and lead 53 to the winding 33.

In operation, the motor 48 as it turns the commutator 47 establishes and breaks the timing circuit flowing through winding 33 in the magnetic clutch plate 32 by means of segment 51 and brush 52. Current flowing in winding 33 attracts the longitudinally fixed metal disc 27, thereby pulling the magnetic clutch plate 32 up along the splined end of shaft 21 against the pressure of spring 34 to make circuit in switch assembly 37 at spring push button 28. This disconnects friction plate 38 from clutch plate 32, and causes current to flow in one direction in coils 24 and 25 so that they attract each other, to thereby align the gimbal frames 14 and 18.

The corrections accomplished by alignment of the frames 14 and 18 in a common plane is required because the torque on frame 18 about axis 20—21 due to the drag of the compass card or other load coupled to shaft 21 causes gradual precession of the gyroscope rotor 10 and accompanying tilting of frame 14 about horizontal axis 15—15. Other forces, such as friction of bearings 22, 23, also effect tilting. This tilting or precession of the gyroscope rotor angularly displaces frame 14 from coincidence with the plane of frame 18. Alignment of frames 14 and 18 is restored and gyroscope rotor 10 is reset periodically to a horizontal axis by the energization of coils 24 and 25 while clutch members 32 and 38 are disengaged as above explained.

As commutator 47 turns, the connection through segment 51 and brush 52 is broken, and the electro-magnetic attractive force ceases as winding 33 deenergizes and allows spring 34 to firmly press magnetic plate 32 against the friction clutch plate 38, whereby the compass card 40 may reproduce the angular position of the shaft and interconnected gyro mechanism to give readings in azimuth.

Thus by providing a novel timing arrangement in circuit with the novel electro-magnetic clutch structure arranged as illustrated and a second restoring coil circuit controlled thereby, there is provided a novel means for restoring a gyroscopic device to a normal plane from an inclined plane thereto, independently of and without disturbing the indicator mechanism.

While only one embodiment in the present invention has been illustrated and described, other changes and modifications, which will now appear to those skilled in the art, may be made without departing from the scope of the present invention. Reference is, therefore, to be had to the appended claims for a definition of the limits of the present invention.

I claim:

1. In a directional gyroscope, a vertical frame mounted for rotation in azimuth, an indicator, a coupling between said indicator and said vertical frame, a gyro frame mounted for oscillation about a horizontal axis at an angle to the axis of the rotor of the gyroscope in said vertical frame, a second vertical frame secured to said gyro frame and adapted to align concentrically within said first-named vertical frame when the axis of said rotor is horizontal, means carried by each of said vertical frames adapted to be periodically energized to thereby magnetically attract each other into concentric alignment when said gyro frame has become tilted on its horizontal axis, a power circuit connected to said means for supplying current thereto, means adapted to close and open said power circuit to said first-named means, and electro-magnetic means adapted to disengage said coupling and release said indicator from said first vertical frame when said power circuit is closed by said last-named means.

2. In a directional gyroscope, a vertical frame mounted for rotation in azimuth, an indicator adapted to be coupled to said vertical frame for rotation therewith, a gyro frame mounted for oscillation about a horizontal axis at an angle to the axis of the rotor of the gyroscope in said vertical frame, a second vertical frame secured to said gyro frame and adapted to align concentrically within said first-named vertical frame when the axis of said rotor is horizontal, means carried by each of said vertical frames adapted to be periodically energized to thereby magnetically attract each other into concentric alignment when said gyro frame has become tilted on its horizontal axis, a power circuit connected to said means for supplying current thereto, a power driven commutator adapted to make and break said power circuit, coupling means between said indicator and said first vertical frame, and electro-magnetic means adapted to disengage said coupling means, said electro-magnetic means being controlled by said commutator whereby said coils are energized when said indicator is disengaged.

3. A resetting device for the gyro rotor of a free gyroscope having a rotor bearing frame, comprising a gyro rotor, a frame bearing said rotor for rotation about its axis, a vertically extending frame carried by said rotor bearing frame, a second vertical frame mounted for movement in azimuth on a pair of shaft members, said first and second vertical frames being pivoted together on a horizontal axis at right angles to the axis of said rotor, an indicator, means for coupling said indicator to one of said shafts, coil means carried by each of said vertical frames, an electric source of power, electro-magnetic means for disengaging said coupling means, and a make and break device for connecting said coil means and said electro-magnetic means in circuit with said source of power periodically.

4. Means for automatically and periodically restoring a gyroscopic device having three degrees of freedom, comprising in combination with a pair of concentrically mounted members, one of which is rotatable in azimuth on a vertical axis and the other of which is adapted to oscillate about a horizontal axis with a gyro gimbal frame, a coil carried by each of said members, and means adapted to periodically produce a mutual magnetic attraction in each coil for the other, whereby the said concentrically mounted members attract each other periodically into concentric alignment.

5. A system for periodically resetting directional gyroscope devices comprising a pair of concentrically arranged frames, one frame being rotatable in azimuth and the other being oscillatable about a horizontal axis with a gyro gimbal frame, a gyro rotor mounted within said gyro gimbal frame, coil means on each of said concentrically arranged frames connected to a source of electric power to provide a flow of current, and means adapted to periodically make and break the flow of current through said coil means, whereby the gyro rotor and its supporting frame are periodically reset in response to the magnetic fields produced by each flow of current in said coil means.

6. In a directional gyroscope adapted to spin about a normally horizontal axis mounted in a gimbal frame adapted to oscillate about a horizontal axis at right angles to said spin axis, means for restoring said gyroscope gimbal frame to a normally horizontal plane after precession, consisting of a pair of concentrically mounted relatively movable coils, one of said coils being movable about a vertical axis perpendicular to said spin axis and the other of said coils being movable with said gimbal about a horizontal axis perpendicular to said spin axis in response to a departure of said spin axis from its normally horizontal position for moving said gimbal into its normally horizontal plane, and timing means adapted to periodically energize said coils to thereby produce a mutual magnetic attraction in each of said coils for the other, whereby any relative displacement of said coils from concentric alignment may be reestablished to thereby restore said spin axis to its normally horizontal position.

7. Means for restoring a gyroscope device mounted for three degrees of freedom, comprising a coil means connected to a source of power movable according to the precessions of said device, a second coil means connected in parallel with said movable coil mounted concentrically around said movable coil, and a commutator adapted to periodically energize each of said coil means to thereby electrically restore said gyroscope device to a neutral horizontal plane when altered therefrom by precessional forces.

8. Means for restoring a directional gyroscope device including means for mounting said device for three degrees of freedom, comprising an electric circuit, means carried by said means and connected in said circuit arranged to attain concentric alignment with each other, one of said means being rotatable in azimuth and the other oscillatable about a horizontal axis, electro-magnetic means in said circuit adapted to supply current to said concentrically arranged means, and means adapted to periodically energize said electro-magnetic means, to thereby provide current flow to said concentrically arranged means so as to produce forces sufficient to concentrically align the concentric means and restore said gyroscope device to a neutral horizontal axis.

9. In a directional gyroscope, means for resetting the gyroscope comprising an outer gimbal frame and an inner gimbal frame mounted within said outer frame on a horizontal axis at substantially right angles thereto and adapted to oscillate about said axis in which is mounted a gyro rotor, a second inner frame carried by and extending at substantially right angles to said first inner frame adapted to normally align with said outer gimbal frame during horizontal equilibrium of said inner gimbal frame, coil means carried by said outer and second inner frames, and means adapted to periodically energize said coils to thereby make them magnetically attract each other into coincidence.

10. In gyroscopic device, the combination comprising a rotor, a rotor frame rotatably mounting said rotor and supported for rotation on a horizontal axis, a vertical frame mounted for rotation on a vertical axis and pivotally supporting said rotor frame on a horizontal axis at right angles to the axis of rotation of said rotor, a second vertical frame having connection with said rotor frame, said second vertical frame being disposed in the vertical plane of said first vertical frame when the axis of rotation of said rotor is horizontally disposed, a coil carried by each of said vertical frames, and means for periodically energizing said coils to restore said vertical frames to a common vertical plane in the event tilting of said second vertical frame and rotor frame about their horizontal axis has occurred during operation of said gyroscopic device.

11. In a gyroscopic device, the combination comprising a rotor, a rotor frame for mounting said rotor on a horizontal axis, a vertical frame mounted for rotation on a vertical axis and pivotally supporting said rotor frame on a horizontal axis at right angles to the axis of rotation of said rotor, a coil carried by said vertical frame, a second coil carried by said rotor frame, said coils being normally disposed in a common plane when the axis of rotation of said rotor is horizontally disposed, and means for periodically energizing said coils to restore said coils to a common plane in the event tilting of said rotor frame has occurred during operation of said gyroscopic device.

12. In a gyroscopic device, the combination comprising a rotor, a rotor frame rotatably mounting said rotor and supported for rotation on a horizontal axis, a vertical frame mounted for rotation on a vertical axis and pivotally supporting said rotor frame on a horizontal axis at right angles to the axis of rotation of said rotor, an object adapted to be actuated by said first vertical frame, means connecting said object and said vertical frame, a second vertical frame having connection with said rotor frame, said second frame being disposed in the vertical plane of said first vertical frame when the axis of rotation of said rotor is horizontally disposed, means for periodically disengaging said connecting means between said first vertical frame and said object, a coil carried by each of said vertical frames, and means for periodically energizing said coils to restore said vertical frames to a common plane in the event tilting of said second vertical frame and rotor frame about their horizontal axis has occurred during operation of said gyroscopic device.

GREGORY V. RYLSKY.

REFERENCES CITED

The following references are of record in the file of this patent:

UNITED STATES PATENTS

| Number | Name | Date |
|---|---|---|
| 1,788,807 | Sperry | Jan. 13, 1931 |
| 1,269,481 | Mathews | June 11, 1918 |
| 2,252,338 | Alkan | Aug. 12, 1941 |
| 1,704,489 | Sperry | Mar. 5, 1929 |

FOREIGN PATENTS

| Number | Country | Date |
|---|---|---|
| 596,146 | French | Oct. 16, 1925 |